(12) United States Patent
Baraty

(10) Patent No.: US 6,266,579 B1
(45) Date of Patent: Jul. 24, 2001

(54) SYSTEM FOR REDUCING DISASTER DAMAGE

(76) Inventor: Mohammad Reza Baraty, 2717 W. 29th Avenue, Vancouver, B.C. (CA), V6L 1X8

( * ) Notice: Subject to any disclaimer, the term of this patent is extended or adjusted under 35 U.S.C. 154(b) by 0 days.

(21) Appl. No.: 09/022,667

(22) Filed: Feb. 12, 1998

(30) Foreign Application Priority Data

Mar. 5, 1997 (CA) .................................................. 2199189

(51) Int. Cl.[7] .................................................. G01M 1/38
(52) U.S. Cl. ........................... 700/275; 340/628; 340/690
(58) Field of Search .................................. 700/292, 275, 700/293; 340/628, 690

(56) References Cited

U.S. PATENT DOCUMENTS

| 3,714,456 | 1/1973 | Krohmer et al. | 307/117 |
|---|---|---|---|
| 4,414,994 | 11/1983 | Hogan | 137/38 |
| 4,833,461 | 5/1989 | Yeager | 340/690 |
| 4,841,287 | 6/1989 | Flig et al. | 340/690 |
| 5,240,024 | * 8/1993 | Moore et al. | 137/38 |
| 5,267,587 | * 12/1993 | Brown | 137/624.12 |
| 5,489,889 | 2/1996 | Kambouris et al. | 340/540 |
| 5,568,825 | * 10/1996 | Faulk | 137/624.11 |
| 5,601,108 | 2/1997 | Perry | 137/15.11 |
| 5,689,233 | * 11/1997 | Kurisu et al. | 340/506 |

FOREIGN PATENT DOCUMENTS

| 2163696 | 11/1995 | (CA) . |
|---|---|---|
| 694 859 A2 | 1/1996 | (EP) . |
| WO 93/20544 | 10/1993 | (WO) . |

* cited by examiner

Primary Examiner—William Grant
Assistant Examiner—Edward F. Gain, Jr.
(74) Attorney, Agent, or Firm—Christensen O'Connor Johnson Kindness PLLC

(57) ABSTRACT

A system monitors and controls external utilities interacting with a site to mitigate hazards during disaster or other emergency situations. Upon the occurrence of a disaster or other emergency event, the system disconnects the external utilities from the site to drive the site into a simplified safe state. With the site thus stabilized, the system then carefully attempts to reconnect any utility that does not threaten the site.

24 Claims, 8 Drawing Sheets

SYSTEM FOR REDUCING DISASTER DAMAGE

FIELD OF THE INVENTION

The present invention relates to a system for controlling the utility connections to a site such as a building. More particularly, it relates to such a system for coping with emergency situations such as earthquakes, fires, and floods.

BACKGROUND OF THE INVENTION

Natural disasters can strike quickly and without warning. A quick and well-reasoned response to the emergency situation is critical to preserving life and health. Unfortunately, people may have difficulty reacting quickly under such circumstances; it may even be impossible to observe, let alone analyze, all of the environmental factors necessary to take proper action. Such situations suggest technological solutions.

Shutoff devices for coping with specific local events are well known. For example, a fuse or circuit breaker will disconnect electricity in case of an over-current condition. A gas valve may disconnect a gas line in the event of a sudden pressure drop. A water valve may disconnect a water line in case of a rupture or a flood.

Such devices, although possibly helpful, are generally ill adapted to handling the complex interactions found in a disaster event. They shut-off a single utility in response to a simple fault condition in the utility. However, a disaster situation can be quite complicated and a simple response may in fact make matters worse. For example, when an earthquake strikes a modern building, more people are generally killed indirectly by a subsequent fire or flood than directly by falling debris; a device that shuts off water to prevent flooding caused by ruptured pipes might defeat critical fire safety systems. On the other hand, if a particular site is not threatened by fire or explosion, a device that automatically shuts off a gas line in response to an earthquake will leave site users without heat until properly certified emergency personnel can re-establish the gas connection—likely a low priority during a crisis. Similarly, if a particular site is not threatened by fire or explosion, a breached water pipe that is left uncontrolled may cause flooding; the flood water may increase the chance of electric shock injuries in the area and may even cause portions of the structure to collapse under the increased load.

A number of solutions for shutting-off multiple utilities have been proposed. K. H. Kambouris and Orlando Jerez propose a "Universal Earthquake Safety Valve," in U. S. Pat. No. 5,489,889, granted on Feb. 6, 1996. Alan Y. Flig and Paul Regan propose an "Earthquake Utilities Cut-Off Control System" in U.S. Pat. No. 4,841,287, granted on Jun. 20, 1989. Roderick D. Hogan proposes an "Earthquake Fire Safety System" in U.S. Pat. No. 4,414,994, granted on Nov. 15, 1983. All three solutions are directed to cutting-off multiple utilities to a site in response to a single complex disaster event—for example an earthquake.

The above three proposed solutions arguably protect a site by neutralizing the utility inputs and thereby simplifying the disaster environment so that the utilities cannot exacerbate the disaster. However, such a strategy is regrettably too simple because automatic utility reconnection is not considered.

Automatic utility reconnection might be advantageous in a number of situations. For example, if a particular utility is not a threat to a site, then it might be an important resource in combating the disaster event: water for fire fighting; electricity for lighting; gas for heat.

Also to be considered is that manual utility reconnection is a painstaking process. For a complex site such as an office tower or a condominium complex, manual reconnection can take days. A skilled person must inspect the utility conduit for breaches or other faults. Most often, the person visually examines the conduit and listens for leaks. He may also have to bring test equipment to the site. In contrast, automatic reconnection employing appropriately arranged installed sensors might be better suited to this task.

Some incredibly complicated solutions have also been proposed for protecting a site in the event of a disaster. Paul E. Barbeau proposes a "Fire Crisis Management System" in Canadian patent application No. 2,065,786, filed on Apr. 10, 1992 and claiming priority from U.S. patent application Ser. No. 07/860,888, filed on Mar. 31, 1992. Barbeau suggests that the protected site be modeled so that an expert system can direct appropriate equipment to combat a fire in real time. Unfortunately, this sort of endeavor requires significant modeling effort and computer power and may therefore not be widely practical. It will be noted that Barbeau restricts his teaching to fire disasters and even then is only able to specify a list of general factors to be considered in programming the expert system.

What is needed is an practical system that will in response to a complex disaster stimulus temporarily place all site utility interconnections into a safe state—preferably a shut-off state—in order to stabilize the site, and then proceed to intelligently and safely reconnect the utilities to the site in order to reestablish normalcy.

The present invention is directed to such a system.

SUMMARY OF THE INVENTION

According to one aspect of the invention there is provided a system for affecting the interaction of a set of utilities within the environment of a site, each member of the set of utilities being created externally from the site and being conducted into the site through an input port having at least one access state wherein the input port facilitates access to the site and at least one restriction state wherein the input port restricts access to the site and being conducted out of the site through an output port having at least one egress state wherein the output port facilitates egress from the site and at least one restriction state wherein the output port restricts egress from the site, the system comprising: means for generating a first fault signal in response to a condition that threatens to degrade the environment of the site, and means for ensuring that the input port for each member of the set of utilities is in a predetermined access state or restriction state in response to the first fault signal.

The ensuring means might ensure that the input port for each member of the set of utilities is in a predetermined restriction state in response to the first fault signal. The system might further include an auxiliary source within the site for providing the site with a first member of the set of utilities when the input port for the first member is in a restriction state. The system might further include means for ensuring that the output port for each member of the set of utilities is in a predetermined egress state or restriction state in response to the first fault signal.

The system might further include means for generating a second fault signal in response to a condition that threatens to degrade the environment of the site, and means for changing the port for a second member of the set of utilities from a restriction state to an access state in response to the second fault signal.

Alternatively, the means for generating the first fault signal might include: means for detecting whether each member of the set of utilities, as measured at its input port, is faulty, means for detecting whether each member of the set of utilities, as measured at its output port, is faulty, and means for detecting whether each member of the set of utilities, as measured within the site, is faulty.

In such a system, a member of the set of utilities might be faulty if it exists in the wrong quantity, it is of a wrong quality, or it exists in the wrong quantity or if it is of a wrong quality.

The system might further include means for receiving at predetermined intervals: the results of the input port detection means, the results of the output port detection means, and the results of the within-site detection means, whereby a measurement dataset is formed from the detection results for each member of the set of utilities and the time the results were received. The system might further include means for recording each measurement dataset to form a measurement dataset history database.

The system might include an expert rules database correlating measurement dataset histories to preferred access states or restriction states for the input port of each member of the set of utilities and preferred egress states or restriction states for the output port of each member of the set of utilities and the means for generating the first fault signal might include means for comparing the measurement dataset history database to the expert rules database to determine the preferred access state or restriction state for the input port of each member of the set of utilities and the preferred egress state or restriction state for the output port of each member of the set of utilities.

The system might further include means for recording at predetermined intervals the first fault signal whereby a signal dataset history database is formed and therefore the expert rules database could further correlate signal dataset histories to preferred access states or restriction states for the input port of each member of the set of utilities and preferred egress states or restriction states for the output port of each member of the set of utilities. Thus the means for generating the first fault signal could also compare the signal dataset history database to the expert rules database.

The system might also include a set of sensors for generating a set of signals in response to a set of conditions that threaten to degrade the environment of the site as well as means for recording at predetermined intervals the set of signals from the set of sensors, whereby an environment dataset history database is formed. In this way, the expert rules database could correlate environment dataset histories to preferred access states or restriction states for the input port of each member of the set of utilities and preferred egress states or restriction states for the output port of each member of the set of utilities and the means for generating the first fault signal could also compare the environment dataset history database to the expert rules database.

The system might also include means for combating a threat to the environment of the site, the combating means having at least one operating state and at least one standby state, the current state being determined in response to a third signal. The expert rules database could correlate measurement dataset histories, signal dataset histories, and environment dataset histories to preferred operating states and standby states for the combating means. The means for generating the third signal could compare the measurement dataset history database, signal dataset history database, and environment dataset history database to the expert rules database. The system might further include means for recording at predetermined intervals the third signal, whereby a combating means dataset history database is formed and thus the expert rules database could correlate the combating means dataset histories to preferred access states or restriction states for the input port of each member of the set of utilities, preferred egress states or restriction states for the output port of each member of the set of utilities and preferred operating states and standby states for the combating means.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
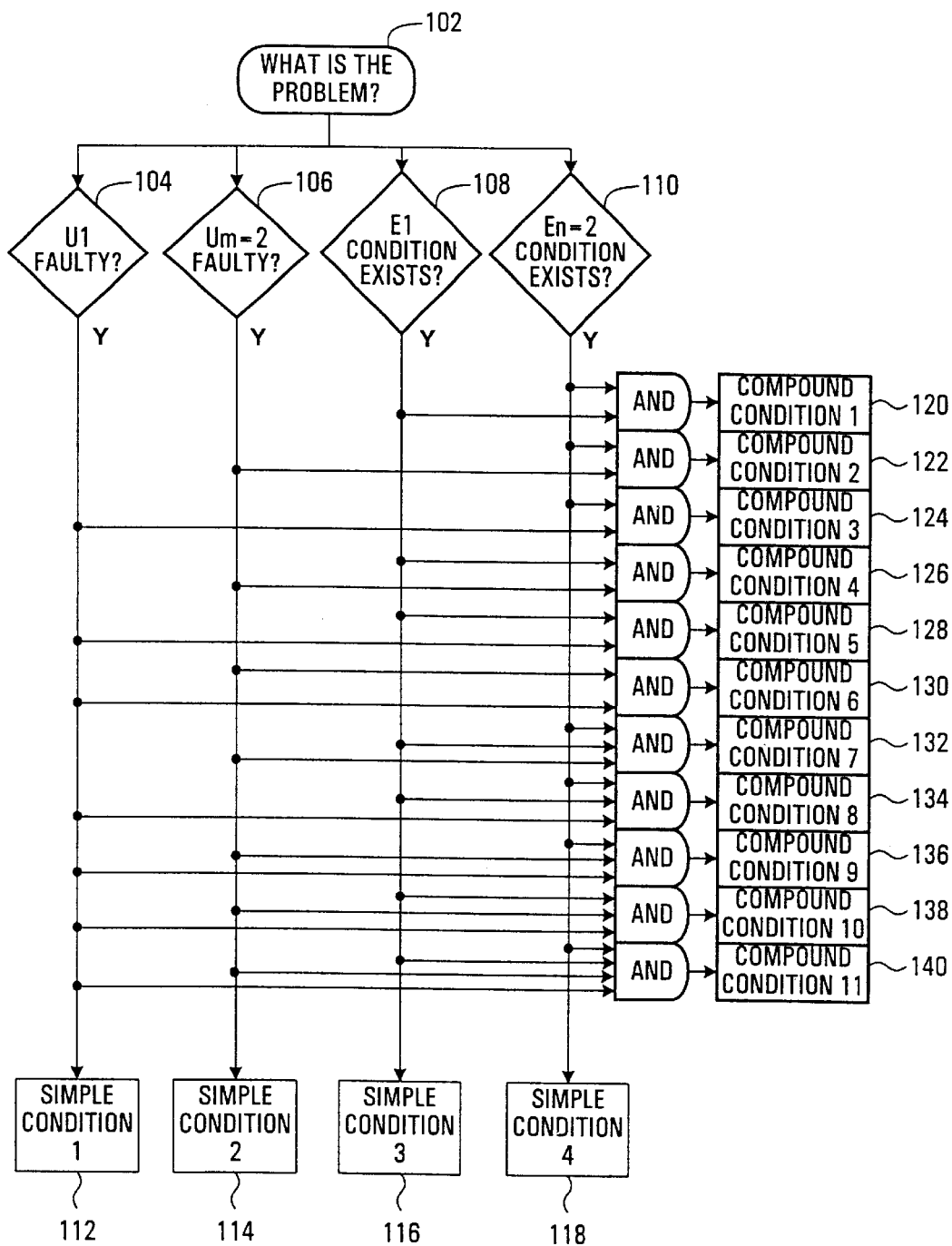
FIG. 1 is a logic diagram illustrating the consequences of a disaster situation.

With reference now to FIG. 1, a framework is provided for analyzing the consequences of a disaster event at a site having an environment affected by a set of utility interactions. As a result of the disaster event, a problem of some sort 102 exists at the site. To determine the nature of the problem, one tests for faults in the set of utilities; for example one would test a first utility ($U_1$) 104, through to an "$m_{th}$" utility ($U_m$) 106. One also tests for the existence of a set of abnormal environmental conditions; for example one would test a first environmental condition ($E_1$) 108 through to an "$n_{th}$" environmental condition ($E_n$) 110.

Each test 104, 106, 108, 110 will indicate the presence or absence of a directly deducible simple condition, respectively 112, 114, 116, 118. However, when combined in intersection sets, the tests will indicate the presence or absence of a number of compound conditions 120, 122, 124, 126, 128, 130, 132, 134, 136, 138, 140. The framework in this example can be generalized such that for an arbitrary number of binary tests, there will exist simple conditions, compound conditions, and 1 null condition wherein no faults have been detected. Tests having non-binary results, for example analogue or fuzzy logic results, would of course yield a greater variety of both simple and compound conditions.

Figure 2:
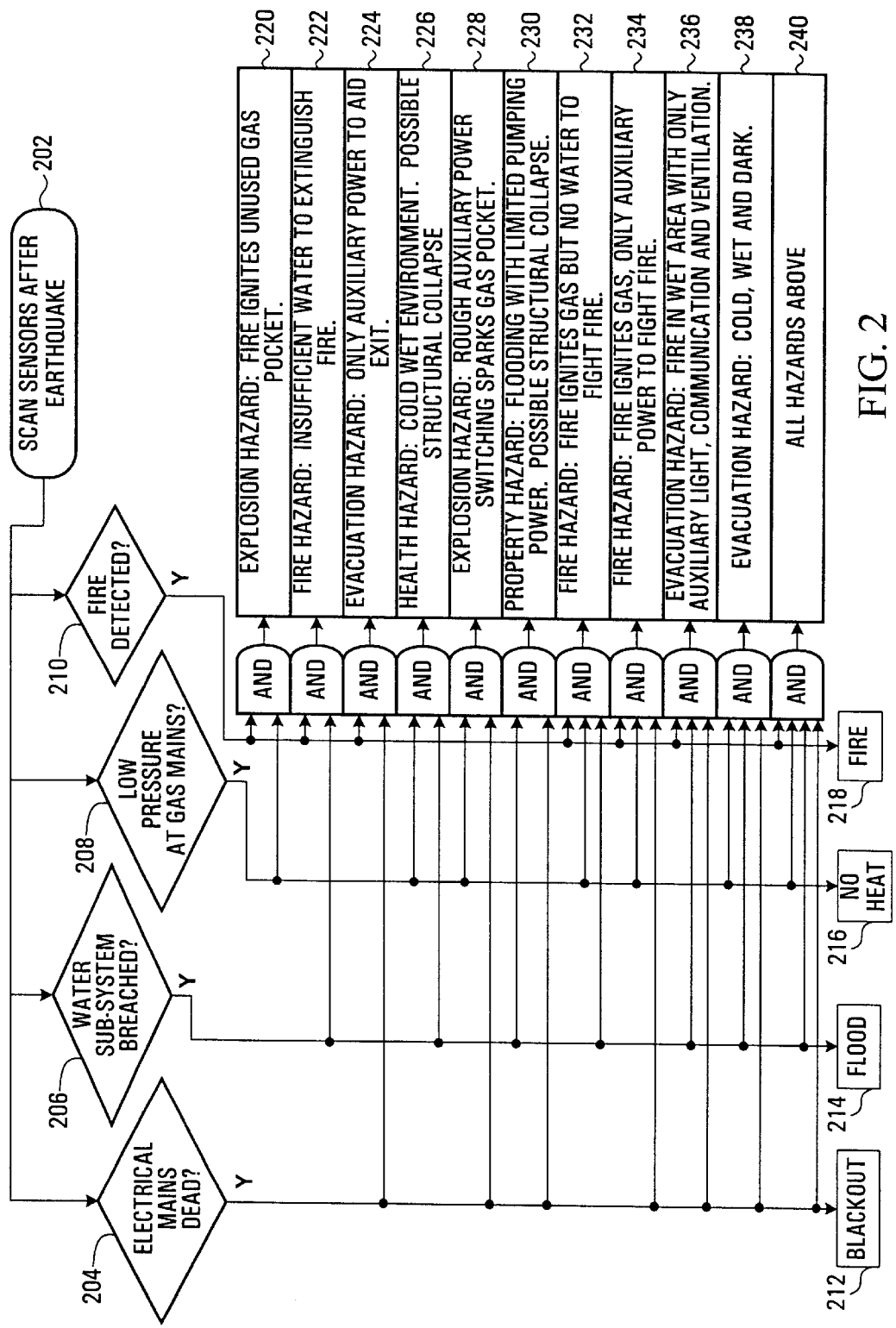
FIG. 2 is a logic diagram illustrating some of the compound consequences after an earthquake disaster situation.

With reference now to FIG. 2, a more specific example is set forth in a logic diagram. After an earthquake, it is desired to ascertain whether an emergency situation exists and to this end, a set of sensors are scanned 202. Certain sensors have been arranged to measure three utilities: electricity, water and gas; these sensors detect: whether the electrical mains are dead ($U_1$) 204, whether the water system within the site has been breached ($U_2$) 206, and whether the pressure at the gas mains is below normal ($U_3$) 208. Certain other environmental sensors have been arranged to detect the presence of fire at a specified location at the site ($E_1$) 210. Clearly, it is contemplated that other utilities $U_m$ and other environmental conditions $E_n$ could be measured. For example, one might choose to monitor such utilities as: air, heating oil, steam, or any other quantity that passes into the site from outside. One might also choose to monitor such site environmental factors as: smoke, temperature, humidity, poison gas, flooding, structural weakness, light level, or even the location or condition of personnel; one might choose to monitor essentially any environmental factor that affects the well-being of persons or property.

In the illustrated example, each test 204, 206, 208, 210 will indicate the presence or absence of a simple condition. In this example, the simple conditions are respectively: blackout 212, flood potential 214, no heating 216, and fire 218. However, the most appropriate response to the actual situation may not be the most appropriate response to any single simple condition 212, 214, 216, 218. A more accurate understanding of the actual situation results from an examination of the compound conditions 220, 222, 224, 226, 228, 230, 232, 234, 236, 238, 240 which comprise the intersection sets of two, three, or four of the simple conditions 212, 214, 216, 218.

For example, if a fire exists when the water system has been breached, compound condition 222, there may be insufficient water to combat the fire, rendering evacuation or other fire fighting strategies much more critical. A response based on the simple condition "Fire" 218 might not take this subtlety into account. Even worse, a response based on the simple condition "Flood Potential" 214 might be to shut off the water utility completely.

Figure 3:
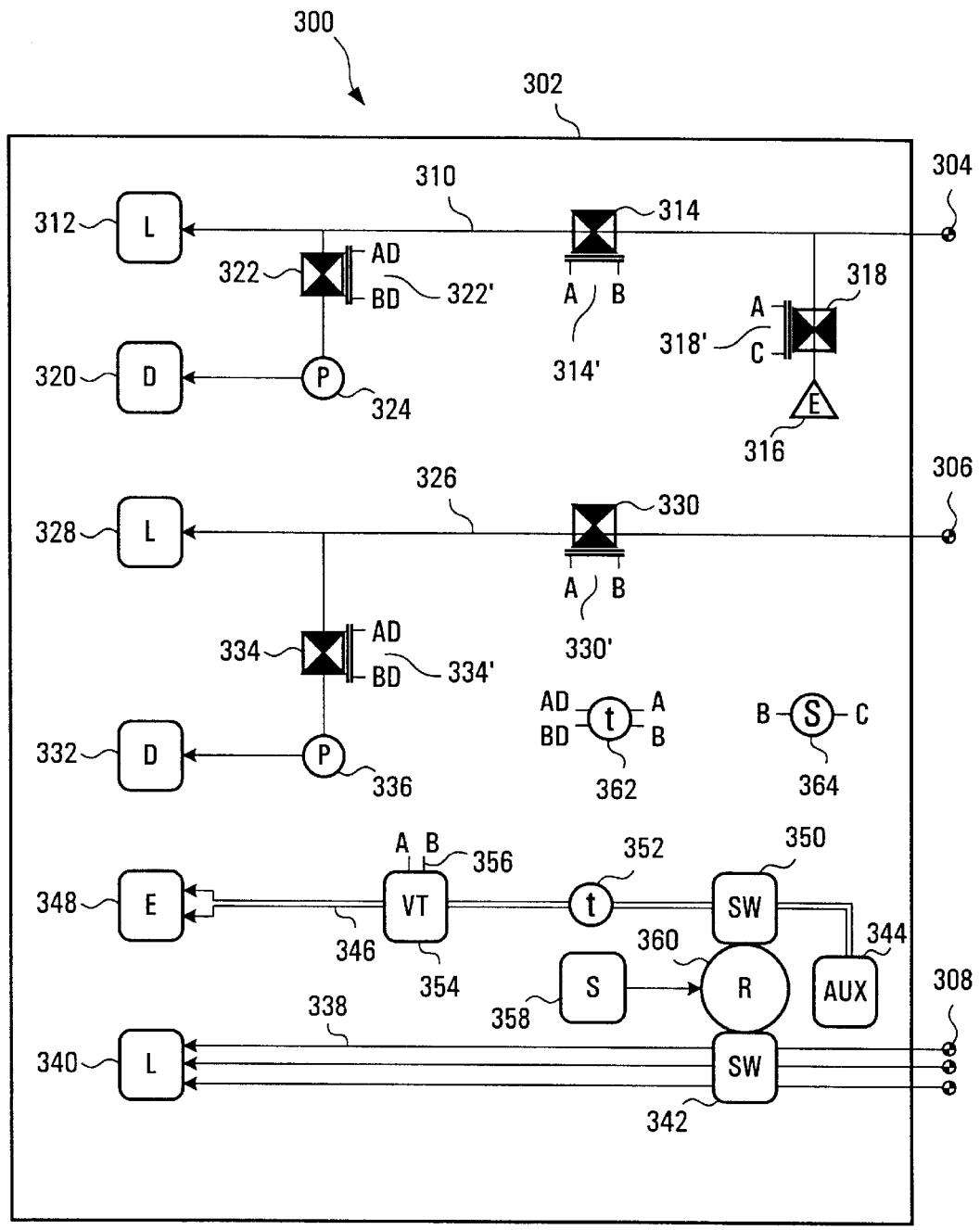
FIG. 3 is a schematic view of a system embodying a first aspect of the invention.

With reference now to FIG. 3, a system embodying an aspect of the invention is illustrated generally at 300. The system 300 aims to control the utility connections within a site 302 so as to reduce the consequences of a disaster situation. The strategy embodied in the system 300 is to first simplify the disaster situation by disconnecting all utilities from the site 302 and then to selectively bring the utilities back on-line as warranted. The site 302 may be a building or other structure, a vessel, or even a sub-network interconnected within a larger utility distribution network. The site 302 is essentially any space defined within a physical or notional border.

The site 302 is connected to an external water main 304, an external gas main 306, and an external electrical main 308.

The water main connection 304 supplies an internal water distribution system 310 which in turn supplies a water load 312 through a normally open main water valve 314 and supplies an emergency water load 316 through a normally open emergency water valve 318. The water load 312 might include faucets, showers, toilets, or radiators. The emergency water load 316 might include a sprinkler system or a standpipe system. A water drain 320 for vacating the water distribution system 310 is connected to the water distribution system 310 through a normally closed water drain valve 322 and a water pump 324, which might be omitted for very small sites such as a house. The main water valve 314, the emergency water valve 318, and the water drain valve 322 each has a corresponding actuator 314', 318', 322', the control of which will be discussed below. The water pump 324 is adapted to start pumping upon the opening of the corresponding water drain valve 322.

The gas main connection 306 supplies an internal gas distribution system 326 which in turn supplies a gas load 328 through a normally open main gas valve 330. The gas load 328 might include a furnace, a stove, or other appliances. A gas vent 332 for vacating the gas distribution system 326 is connected to the gas distribution system 326 through a normally closed gas venting valve 334 and a gas ventilator 336, which might be omitted for very small sites such as a house. The main gas valve 330 and the gas-venting valve 334 each has a correponding actuator 330', 334', the control of which will be discussed below. The gas ventilator 336 is adapted to start evacuating residual gas from the gas distribution system 326 upon the opening of the corresponding gas venting-valve 334.

The electrical main connection 308 supplies an internal main electrical distribution system 338 which in turn supplies an electrical load 340 through a normally closed main electrical switch 342. The electrical load 340 might include lights, heating elements, appliances, communication and computer devices, or machinery. An auxiliary power supply 344 supplies a low voltage emergency electrical distribution system 346 which in turn supplies an emergency electrical load 348 through a normally open auxiliary electrical switch 350, a first time delay unit 352, and a voltage transformer 354 having a secondary winding 356. The emergency electrical load 348 might include lighting, alarm devices, or devices for communicating with locations external to the site 302, for example a main emergency power supply, a fire station or an interconnected related site.

A first sensor module 358 is adapted to test for disaster conditions such as earthquake, fire, or flood having a magnitude greater than a predetermined threshold. It should be understood that the first sensor module 358 might include an array of sensors distributed about the site 302 so as to detect the geographic extent of a disaster condition and to better distinguish an actual disaster condition from a less serious smoking toaster or spilled wash bucket. Such intelligent sensing might be accomplished with analogue weighting functions or digital or fuzzy logic. The first sensor module 358 outputs its signal to a relay 360 which is connected to control the normally closed main electrical switch 342 and the normally open auxiliary electrical switch 350.

The secondary winding 356 of the voltage transformer 354 is connected directly to the main water valve's 314 actuator 314' and to the main gas valve 's 330 actuator 330'. The secondary winding 356 of the voltage transformer 354 is connected indirectly through a second time delay unit 362 to the water drain valve's 322 actuator 322' and the gas venting valve's 334 actuator 334'. The secondary winding 356 of the voltage transformer 354 is connected indirectly to the emergency water valve's 318 actuator 318' through a second sensor module 364 adapted to detect fire, smoke, or undue heat. It should be understood that the second sensor module 364 might include an array of sensors distributed about the site 302. It should also be understood that while the valves 314, 318, 322, 330, 334 are electrically actuated in this example, an analogous control system could be build using other forms of actuation, for example hydraulic or pneumatic actuation.

FIG. 3 is not drawn to scale. The utility connections 304, 306, 308 and valves and switch 314, 318, 322, 330, 334, 342 would be arranged remotely from the site's 302 vulnerable locations and inhabitants. For example, the utility connections 304, 306, 308 and valves and switch 314, 318, 322, 330, 334, 342 could be encased in one or more vaults at the site 302 perimeter; alternatively, these components could be distributed about the site, separated from vulnerable locations, inhabitants, and other such components.

The operation of the system of FIG. 3 will now be described. In the normal state of operation, the main water valve 314, the main gas valve 330, and the emergency water valve 318 will be open, thereby allowing the water load 312, the gas load 328, and the emergency water load 316 to be supplied. Similarly, the main electrical switch 342 will be closed allowing the electrical load to be supplied.

Upon the occurrence of a disaster condition above a predetermined threshold, for example a sufficiently large earthquake, fire, or flood condition, the first sensor module 358 will indicate a disaster condition to the relay 360. The relay will open the main electrical switch 342 and close the auxiliary electrical switch. Subject to a time delay 352 to minimize transients, the auxiliary power supply 344 will then supply the low voltage emergency electrical load 348 to help protect the site 302 and any inhabitants.

The auxiliary electricity passing through the voltage transformer 354 will cause its secondary winding 356 to energize. The energized secondary winding 356 will cause the main water valve 314, the main gas valve 330, and the emergency water valve 318 to be closed by their respective actuators 314', 330', 318', thereby disconnecting the water 304 and gas 306 utilities from the site 302.

After a time delay 362, the energized secondary winding 356 will cause the normally closed water drain valve 322 and the normally closed gas venting valve 334 to be opened by their respective actuators 322', 334'. The water pump 324 and the gas ventilator 336 start evacuating residual water and gas upon the opening of the corresponding valve 322, 334, thereby vacating the water distribution system 310 and the gas distribution system 326 to reduce the probability of subsequent flooding or explosion.

To avoid a situation where fire spreads while the sprinkler system is shut off, the second sensor module 364 monitors for fire, smoke, or undue heat. On detecting such a condition, the second sensor module disrupts the signal from the voltage transformer 354 secondary winding 356 to the emergency water valve's 318 actuator 318'. This disruption might be created with an open circuit, a high impedance, or an opposing current or potential. With the signal from the voltage transformer 354 secondary winding 356 disrupted, the emergency water valve 318 is returned to its normally open condition by its actuator 318', allowing the emergency water load 316 to function normally even though the rest of the water distribution system 310 has been disconnected from the water main 304.

In a smaller site 302, such as a filly-detached house, after it has been determined that the disaster condition is under control and reconnection of the site 302 to the external utilities is desirable, a person can manually reset the relay 360, which will cause the auxiliary electrical switch 350 to open, and after a delay, the main electrical switch 342 to close, thereby connecting the electrical mains 308 to the electrical load 340 once again. With the auxiliary power shut off 344 and disconnected 350 from the emergency electrical load 348, the secondary winding 356 of the voltage transformer 354 will de-energize, causing the valves 314, 318, 322, 330, 334 to be returned to their normal operating states by their respective actuators 314', 318', 322', 330', 334'.

It is contemplated that a larger structure such as a residential or commercial tower or an industrial complex might be better controlled as an interconnected network of individual sites 302, wherein each individual site 302 defines a logical portion of the structure such as an apartment or department. In such a configuration, the first sensor module 358 within an individual site 302 would include not only an array of sensors distributed about the individual site 302, but also a communication interface for sending and receiving status reports or instructions to neighboring sites 302 so that utilities within an individual site 302 could be controlled in response to what was happening within the individual site 302 or within neighboring sites 302. Such a distributed interconnection could provide valuable early warning to a site fortunately removed from the center of a disaster event because the propagation time for disaster consequences will be significantly longer than the propagation time for an electromagnetic warning signal. The interconnection between sites 302 could be a simple peer-to-peer connection as described above or else it could involve a centralized controller, for example a computer located at a fire station or a utility control center, not shown, as will be more fully discussed with respect to FIGS. 4 through 6 below with reference to a second embodiment of the invention.

In a network of interconnected sites 302, after it has been determined that the disaster condition is under control and reconnection of an individual site 302 to the external utilities is desirable, the first sensor module/communications interface 358 will either receive or generate signal to reset the relay 360, which will cause the auxiliary electrical switch 350 to open, and after a delay, the main electrical switch 342 to close, thereby connecting the electrical mains 308 to the electrical load 340 once again. With the auxiliary power shut off 344 and disconnected 350 from the emergency electrical load 348, the secondary winding 356 of the voltage transformer 354 will de-energize, causing the valves 314, 318, 322, 330, 334 to be returned to their normal operating states by their respective actuators 314', 318', 322', 330', 334'.

Figure 4:
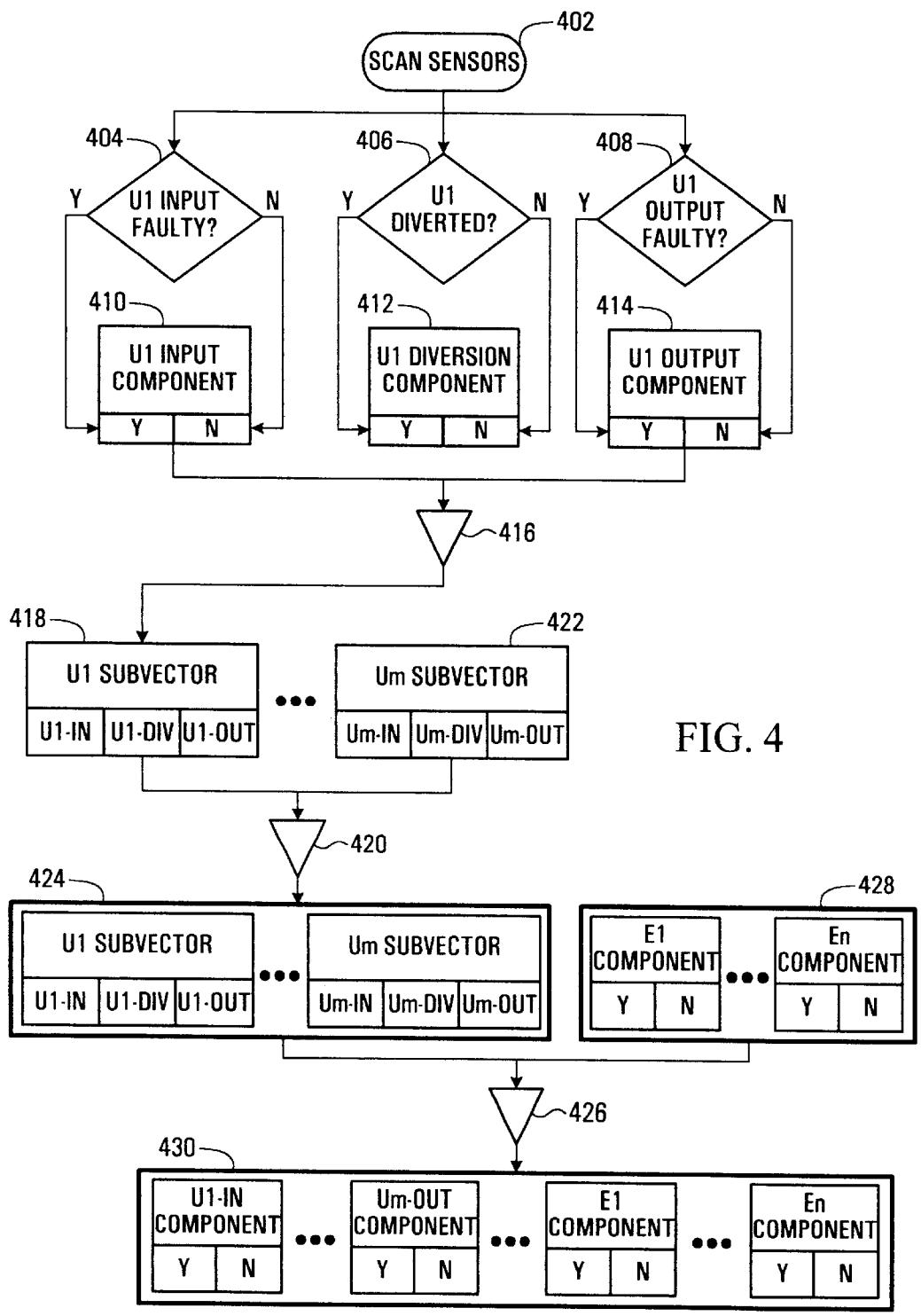
FIG. 4 is a flowchart illustrating a systematic testing process for a site.

With reference now to FIG. 4, an even more systematic process for fault testing a site is illustrated.

A utility, by its nature, enters a site, affects the site, and then leaves the site, although perhaps in changed form. For example, clean water arrives at a site for consumption or use, the water is consumed or used, and then the water leaves the site as wastewater. A systematic testing process might therefore test a utility as it arrives at the site, as it is used at the site, and as it leaves the site. One might test the quality and quantity of the utility at each such stage.

With a set of sensors so arranged to monitor a utility $U_1$, one can scan the sensors 402 in order to conduct a set of tests. One might test if the utility input was faulty 404, if the utility was being diverted from expected use 406, and whether the utility output was faulty 408. One would thereby acquire a set of test results, in this case binary, having the components $U_{1\text{-}IN}$ 410, $U_{1\text{-}DIV}$ 412, and $U_{1\text{-}OUT}$ 414. By merging 416 the three components 410, 412, 414, one is left with a subvector 418 that concisely reflects the condition of the utility.

A further merging operation 420, would merge subvectors 418 through 422 to yield a utility vector 424 that concisely reflects the condition of all utilities interacting with the site. A final merging operation 426 would merge the utility vector 424 with a vector reflecting the condition of all environmental sensors 428 to yield a system vector 430 that concisely reflects the condition of the whole site. It should be noted that the merging of components into vectors does not have to be done in the particular order of this example. It should also be noted that while an arbitrary site can be systematically monitored with reference to its system vector 430, the accurate monitoring of any specific site is unlikely to require that each individual component of the system vector 430 be monitored and, for practical purposes, the values of many such individual components can be left unmeasured or inferred.

Figure 5:
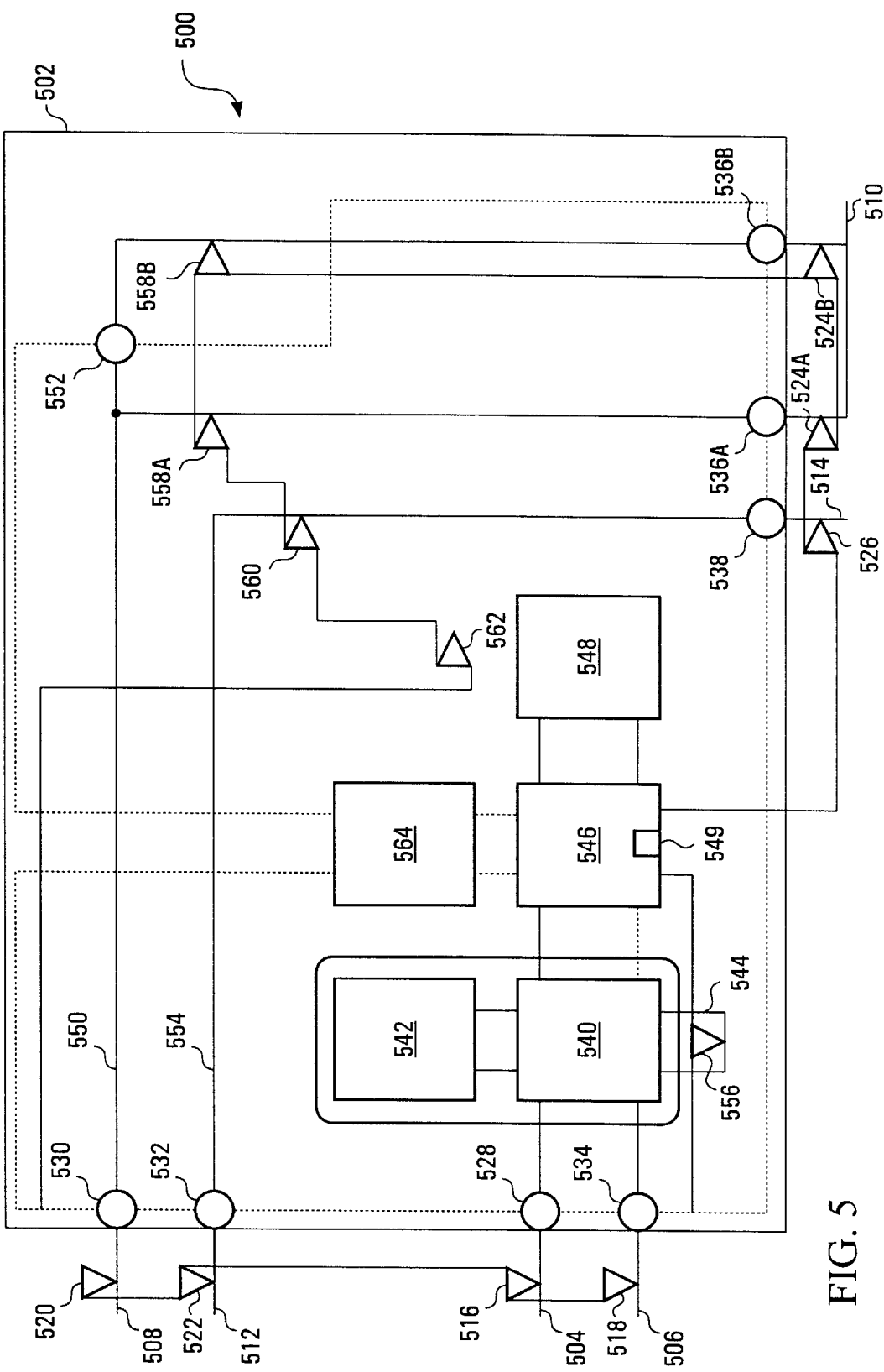
FIG. 5 is a schematic view of a system embodying a second aspect of the invention.

With reference now to FIG. 5, a system embodying another aspect of the invention is illustrated. A site, generally illustrated at 500, is defined within a border 502 and is monitored using the process described with reference to FIG. 4. The strategy embodied in the second embodiment system 500 is more sophisticated than the strategy embodied in the first embodiment system 300. In the second embodiment system 500, the strategy is to continuously monitor the system vector 430 as a source of facts to be analyzed while applying rules to intelligently control the interactions of utilities with the site 500.

Electricity is generated off-site; it is delivered to the site 500 via an electrical main 504 and follows a return path 506 back off the site 500. Similarly water is delivered to the site 500 via a water main 508 and leaves the site through a drain line 510. Natural gas is delivered to the site 500 via a gas main 512; although the gas so delivered is substantially consumed during normal operating conditions, there exists a venting path 514 to expel unconsumed gas in emergency situations.

Each utility input 504, 508, 512 and each utility output 506, 510, 514 is monitored by an interface sensor chosen to measure whether input or output is functioning properly. For example, a sensor 516 connected to the electrical main 504 or a sensor 518 connected to the electrical return path 506 might measure current flow, voltage, power, power quality and/or conductor temperature. A sensor 520 connected to the water 508 main or a sensor 522 connected to the gas main 512 might measure fluid pressure and/or fluid flow. A sensor 524a, 524b connected to the water drain line 510 might measure fluid pressure, fluid flow magnitude, fluid flow direction, and/or drain fluid level. A sensor 526 connected to the gas venting path 514 might measure electrostatic field, temperature, and/or any other factor that might affect the safety of venting natural gas into the region.

Each utility input 504, 508, 512 and each utility output 506, 510, 514 passes through the border 502 into the site 500 via an automated switch or valve as the case may be, 528, 530, 532, 534, 536a, 536b, 538 respectively.

The electrical main 504 and electrical return path 506 connect to a feed selector switch 540. The feed selector switch 540 also connects to an auxiliary power supply 542. The feed selector switch drives an electrical distribution system 544 via either the electrical mains 504 and the return path 506 or the auxiliary power supply 542.

The feed selector switch 540 also provides electrical power to a control unit 546 such as a general-purpose digital computer having standard memory, storage, input/output, and bus architectures and capable of storing and executing preprogrammed instructions. The control unit 546 controls, among other things, the feed selector switch 540 such that the control unit 546 can derive power from sources either external to or internal to the site. It is understood that the control unit 546 has access to a dedicated standby power system 548 such as a D.C. inverter or an uninterruptable power supply for use specifically during any feed selector switch 540 switching operation.

The control unit 546 includes a network interface port 549 for transmitting signals to and receiving signals from control units 546 at remotely located sites 500. Such a networked arrangement provides the opportunity for remotely located sites 500 to inform a local site 500 of an impending disaster event or even to directly control the local site 500. Such communication can occur using any of the well known networking protocols.

The water main 508 is connected to the water drain line 510 via a water distribution system 550 comprising an emergency subsystem 550a and a main subsystem 550b. The emergency subsystem 550a is connected to the main subsystem via an automated valve 552. It should be noted that this configuration permits the main subsystem 550b to be drained independently of the emergency subsystem 550a in case of a breached pipe.

The gas main 512 is connected to the gas vent 514 via a gas distribution system 554.

The interface sensors 516, 518, 520, 522, 524a, 524b, 526 all provide their signals to the control unit 546. The control unit 546 receives further information from operation sensors inside the site 500. At least one operation sensor 556 measures the use of electricity carried by the electrical distribution system 544. This sensor 556 might measure current flow, voltage, power, power quality, conductor temperature, and/or ground fault. At least one operation sensor 558a, 558b measures the use of water carried by the emergency waster subsystem and the main water subsystem respectively. These sensors 558a, 558b might measure fluid flow and/or fluid pressure. At least one operation sensor 560 measures the use of the gas carried by the gas distribution system 554. This sensor might measure gas flow and/or pressure.

Finally, at least one environmental sensor 562 may be used to measure environmental factors inside the site 500. One might choose to monitor such site factors as: earthquake, smoke, temperature, humidity, poison gas, flooding, light level, and/or even the location or condition of personnel; one might choose to monitor essentially any environmental factor that affects the well-being of person or property. The environmental sensor 562 might also take the form of a panic button.

The interface sensors 516, 518, 520, 522, 524a, 524b, 526, the operation sensors 556, 558a, 558b, 560, and the environmental sensors 562 might be connected to the control unit 546, individually, in series, in parallel, in open circuit, in closed circuit or in whatever fashion is deemed appropriate.

The control means of each of the automated valves and switches 528, 530, 532, 534, 536a, 536b, 538, 552 are connected to be individually controlled by the control unit 546; they may be connected individually, in series, in parallel, in open circuit, in closed circuit or in whatever fashion is deemed appropriate.

Finally, other automated devices 564 inside the site 500 may be connected to the control unit 546 to help mitigate an emergency situation. Such devices 564 might include an alarm, emergency lighting, an automated public address or telephone system, a sprinkler system, or the like.

Figure 6:
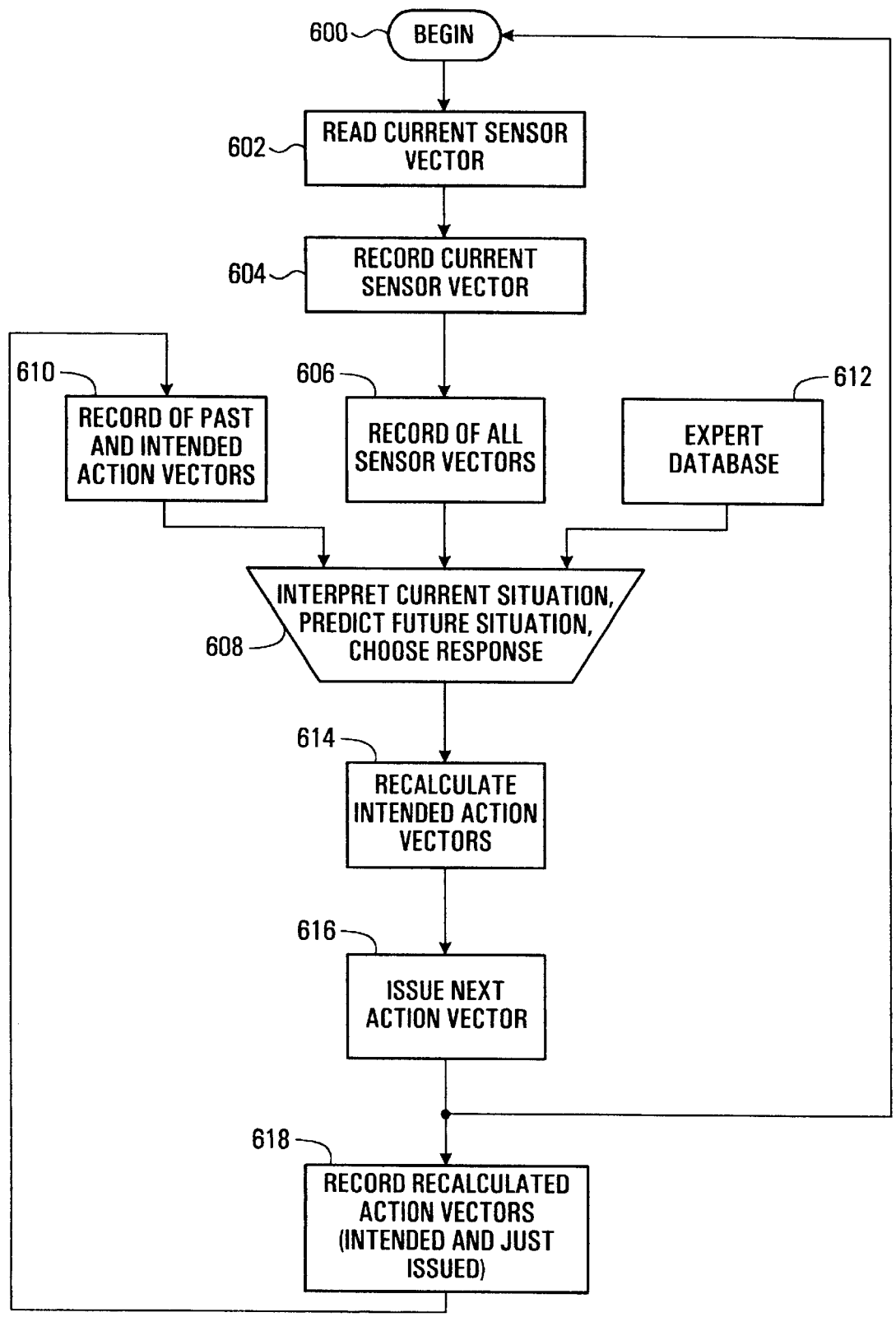
FIG. 6 is an overview flowchart illustrating the operation of the system of FIG. 5.

With reference now to FIG. 6, the overall operation of the system embodied in FIG. 5 will now be discussed.

Once the system is initialized 600, the control unit 546 reads the current sensor vector 602 which has as its components a signal from each of the interface sensors 516, 518, 520, 522, 524a, 524b, 526, the operation sensors 556, 558a, 558b, 560, and the environmental sensors 562. The current sensor vector is recorded 604 in a table of all sensor vectors measured over a predetermined period of time 606.

The control unit 546 uses the record of all sensor vectors 606 to interpret the current situation, predict the future situation, and choose an appropriate plan of response 608. The control unit 546 is guided in this task 608 by a record of past and intended action vectors 610 and an expert database 612 which are described herein. The control unit 546 interacts with the site 500 by issuing action vectors which have as their components a control signal for each automated switch, valve, or device 528, 530, 532, 534, 536a, 536b, 538, 552, 564. A record of past and intended action vectors 610 and a record of all sensor vectors 606 are therefore helpful in choosing a course of action 608 because they embody an action history, an action plan, and feedback on the plan's results. The final component helpful in choosing the course of action 608 is an expert database 612 which might include a hierarchical set of general rules embodying the best current understanding of the complex interactions of a wide variety of emergency situations and environmental conditions and specific rules for coping with emergency situations at the particular site 500.

For example, a low-level general rule might state that water distribution within a site 500 should be blocked in the case of a breached water distribution system 550. A higher level general rule might state that water distribution must not be blocked to the emergency water mains 550b if a fire exists at the site 500, even if the emergency water mains 550b have been breached and are responsible for flooding. A still higher level general rule might state that even when a fire exists at a site 500, water distribution must be blocked if, as a result of a breached emergency water main 550b, flood waters have reached a level that threatens the site with structural collapse.

An example of a low level specific rule is one that might state that a sprinkler system should only be engaged when absolutely necessary in an area where important documents or electronic systems are vulnerable to flood damage. A higher level specific rule might state that the sprinkler system must be engaged if a fire in the document or electronic system area threatens to spread to an adjacent area used to store cylinders of compressed explosive gas.

Once a response is chosen 608, the intended action vectors are recalculated 614 to a depth consistent with the processing power of the control unit 546 and the next action vector is issued 616 to the automated switches, valves, and devices 528, 530, 532, 534, 536a, 536b, 538, 552, 564. The recalculated action vectors, both those intended and that just issued, are then recorded 618 in the record of past and intended action vectors 610 and the process loops back to read the new current sensor vector 602.

Figure 7:
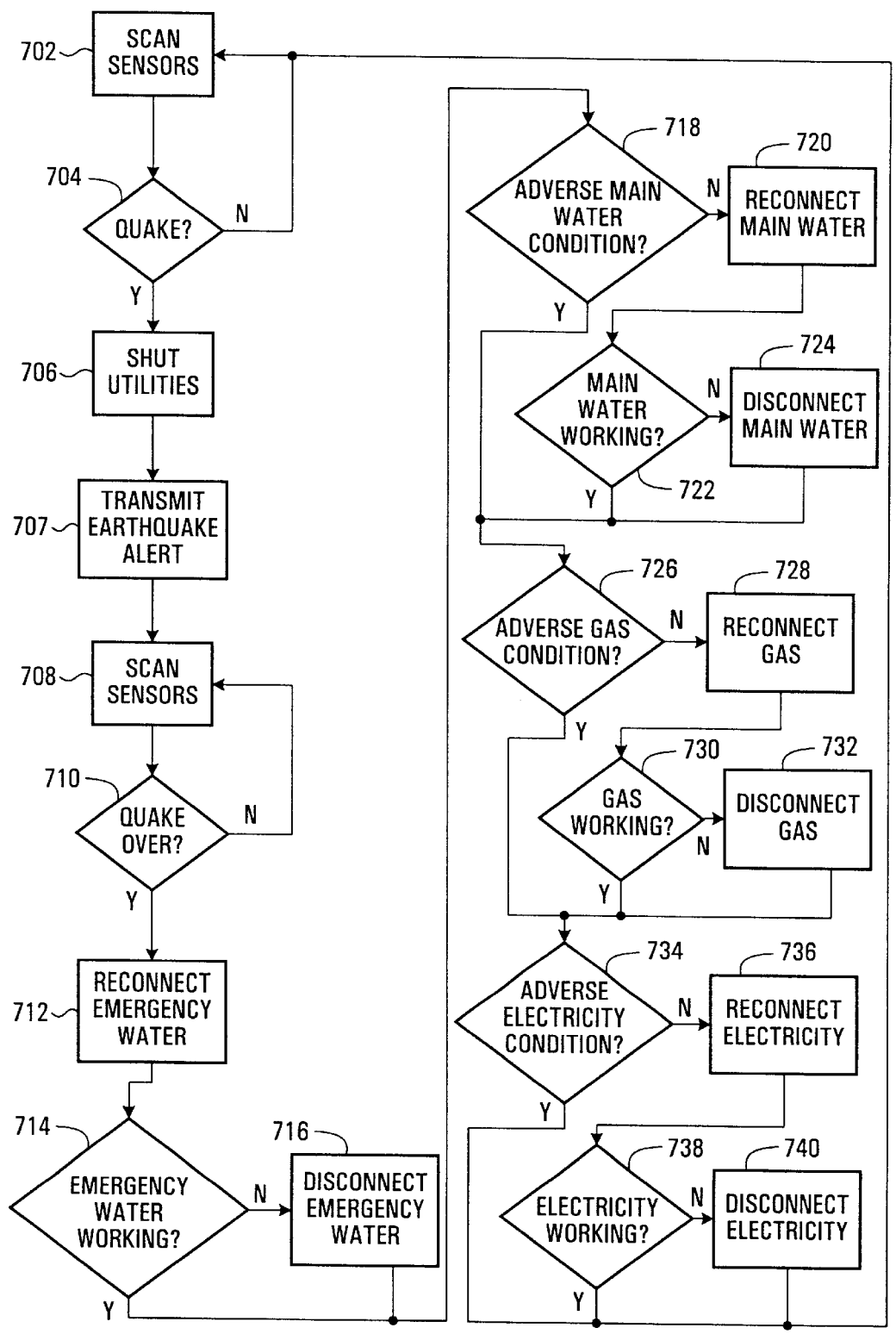
FIG. 7 is a flowchart illustrating a specific simplified implementation of the system of FIGS. 5 and 6.

It is understood that such a rigorous system is both complicated and expensive and may not be warranted in many situations. To this end, simplification to yield a practical, cost effective and site-independent implementation would be advantageous. With reference now to FIGS. 5 and 7, such a simplified implementation will now be discussed. The protection strategy embodied in this implementation is to cut-off a site's utility connection upon the occurrence of a complex disaster event, such as an earthquake, and then to carefully and sequentially reestablish these connections. It should be emphasized that in this simplified implementation the utility interface sensors 516, 518, 520, 522, 524a, 524b, 526 of the sensors may be omitted in favor of obtaining data more simply through the operation sensors 556, 558a, 558b, 560.

With reference now to FIGS. 5 and 7, the operation of the simplified system for reducing disaster damage will now be described. Block 702 directs the control unit 546 to monitor the environmental sensors 562 and the network interface port 549. Based upon this acquired information, block 704 directs the control unit 546 to determine whether an earthquake is occurring, either locally or remotely. If no earthquake is occurring, then the control unit 546 is directed back to block 702 for further monitoring.

Alternatively if an earthquake is occurring, then block 706 directs the control unit 546 to cause the utility connection automated valves and switches 528, 530, 532, 534, 536a, 536b, 538, 552 to cut-off all of the external utilities from the site 500. If the earthquake is local, block 707 directs the control unit 546 to transmit over the network interface port 549 the existence of a local earthquake.

Thereafter, block 708 directs the control unit 546 to continue to monitor the earthquake sensor 562 and the network interface port 549 and block 710 directs the control unit 546 to determine if the earthquake has ceased. If not, then the control unit 546 is directed back to block 708 for further monitoring.

Alternatively, if the earthquake has ceased, then block 712 directs the control unit 546 to cause the emergency water automated valves 530, 536a to reconnect the emergency water subsystem 550a to the water main 508. Block 714 then directs the control unit 546 to determine whether the emergency water subsystem 550a is working properly as indicated by the emergency water subsystem operation sensor 558a or whether instead the conduit has been breached. If the emergency water subsystem 550a is faulty, then block 716 directs the control unit 546 to cause the emergency water automated valves 530, 536a to again disconnect the subsystem 550a from the water main 508 so as not to jeopardize either the site 500 or the external water utility.

Alternatively, if the emergency water subsystem 550a is functioning properly, then the reestablished connection is not altered.

In either case, block 718 directs the control unit 546 to monitor the environmental sensors 562 to determine whether any envirorunmental condition exists at the site 500 that would make it imprudent to reconnect the main water subsystem 550b to the water main 508. For example, if the environmental sensors 562 indicate that the site 500 is already flooded, it may not be prudent to reconnect the main water subsystem 550b. If such an adverse condition is found to exist, then block 718 directs the control unit 546 forward to block 726 as will be further described below.

Alternatively, if no such adverse condition exists, then block 720 directs the control unit 546 to cause the main water automated valves 552, 536b to reconnect the main water subsystem 550b to the water main 508. Block 722 then directs the control unit 546 to determine whether the main water subsystem 550b is working properly as indicated by the main water subsystem operation sensor 558b or whether instead the conduit has been breached. If the main water subsystem 550b is faulty, then block 724 directs the control unit 546 to cause the main water automated valves 552, 536b to again disconnect the subsystem 550b from the water main 508 so as not to jeopardize either the site 500 or the external water utility. Alternatively, if the main water subsystem 550b is functioning properly, then the re-established connection is not altered.

Block 726 then directs the control unit 546 to monitor the environmental sensors 562 to determine whether any environmental condition exists at the site 500 that would make it imprudent to reconnect the gas distribution system 554 to the gas main 512. For example, if the environmental sensors 562 indicate that a fire exists at the site 500, it may not be prudent to reconnect the gas utility. If such an adverse condition is found to exist, then block 726 directs the control unit 546 forward to block 734 as will be further described below.

Alternatively, if no adverse gas condition exists, then block 728 directs the control 546 to cause the gas automated valves 532, 538 to reconnect the gas distribution system 554 to the gas main 512. Block 730 then directs the control unit 546 to determine whether the gas distribution system 554 is working properly as indicated by the gas distribution system operation sensor 560 or whether instead the conduit has been breached. If the gas distribution system 554 is faulty, then block 732 directs the control unit 546 to cause the gas automated valves 532, 538 to again disconnect the subsystem 554 from the gas main 512 so as not to jeopardize either the site 500 or the external gas utility. Alternatively, if the gas distribution system 554 is functioning properly, then the connection is not altered.

Block 734 then directs the control unit 546 to monitor the environmental sensors 562 to determine whether any environmental condition exists at the site 500 that would make it imprudent to reconnect the electrical distribution system 544 to the electrical main 504, 506. For example, if the environmental sensors 562 indicate that a gas leak or flooding exists at the site 500, it may not be prudent to reconnect the electrical utility. If such an adverse condition is found to exist, then block 734 directs the control unit 546 forward to block 702 to again monitor for earthquake conditions.

Alternatively, if no adverse electrical condition exists, then block 736 directs the control unit to cause the electrical automated switches 528, 534 to reconnect the electrical distribution system 544 to the electrical main 504, 506. Block 738 then directs the control unit 546 to determine whether the electrical distribution system 544 is working properly as indicated by the electrical distribution system operation sensor 556 or whether a circuit fault exists. If the electrical distribution system 544 is faulty, then block 740 directs the control unit 546 to cause the electrical automated switches 528, 534 to again disconnect the subsystem 544 from the electrical main 504, 506 so as not to jeopardize either the site 500 or the external electrical utility. Alternatively, if the electrical utility is functioning properly, then the connection is not altered.

The control unit 546 is then directed back to block 702 to monitor for further earthquakes.

From this implementation, it can be seen that a reasonable degree of disaster damage mitigation can be achieved by judiciously disconnecting and then reconnecting external utilities according to simple and site-independent criteria.

Figure 8:
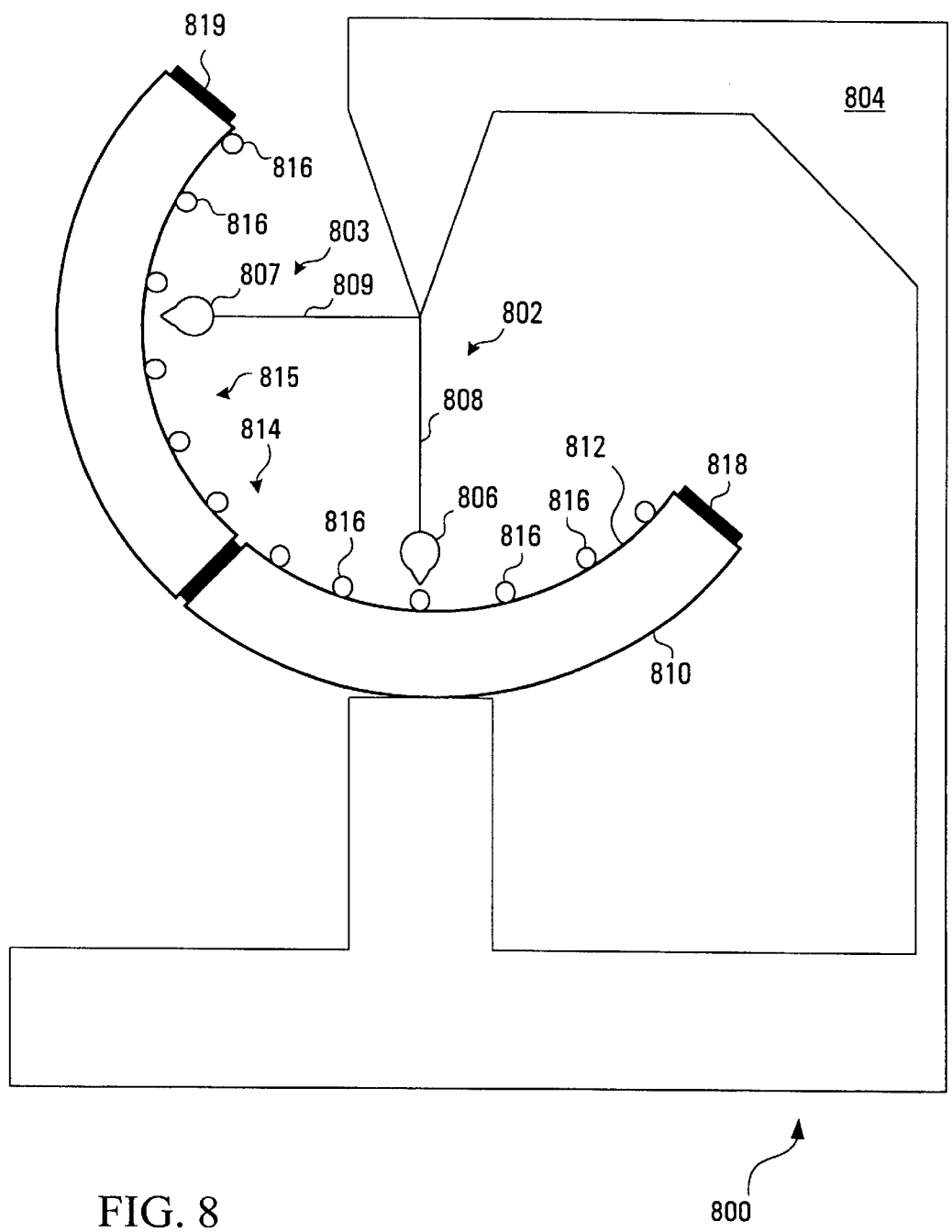
FIG. 8 is a cross-sectional view of an earthquake sensor for use in association with the systems of FIGS. 3 and 5.

Referring now to FIG. 8, an earthquake sensor is illustrated generally at 800. This earthquake sensor, when use with a disaster detection system such as the one illustrated in FIG. 5, will yield useful data about an earthquake's magnitude, period, and direction.

The sensor 800 includes a pendulum mechanism 802 comprising a support 804, a first mass 806, and a suspension cable 808 for suspending the first mass 806 from the support 804. The pendulum mechanism 802 is constructed such that the first mass 806 can oscillate freely in any direction, being constrained only by the suspension cable 808. The pendulum mechanism 802 is oriented to measure the horizontal acceleration component of an earthquake.

The sensor 800 also includes a spring mechanism 803 comprising the support 804, a second mass 807, and a resilient rod 809 for horizontally supporting the second mass 807 from the support 804. The spring mechanism 803 is constructed such that the second mass 807 may oscillate freely in any direction, being constrained only by the resilient rod 809. The spring mechanism 803 is oriented to measure the vertical acceleration component of an earthquake.

Circumscribing the first mass 806 and the second mass 807 is a semispherical shell 810 so located with respect to the pendulum support 804 that the first mass 806 and the second mass 807 always remain a uniform distance from the inner surface 812 of the shell 810. The inner surface of shell 812 is divided into first and second grids 814, 815. At each intersection point on the grids 814, 815, there is located an individually addressable or otherwise identifiable sensor 816 that generates a signal in response to its proximity to either the first mass 806 or the second mass 807 which respectively cast sensor-detectable shadows on the first and second grids 814, 815. This coupling between the array of sensors 816 and the first and second masses 806, 807 is preferably electromagnetic; however, other forms of coupling can be envisioned. For example, the coupling might be optical or sonic. It is also envisioned that the coupling might be either active or passive.

First and second output ports 818, 819 are respectively connected to receive the sensor 816 signals from the first and second grids 814, 815 and to generate for output a composite digital signal representing the current sensor 816 response of the respective grid 814, 815.

When an earthquake occurs, the earthquake forces are transmitted to the pendulum mechanism 802 and the spring mechanism 803, causing the first mass 806 and the second mass 807 to oscillate predictably in response. The motion of the first and second masses 806, 807 will be proportional to the earthquake forces and this motion will yield magnitude, period, and direction data about the earthquake.

As the first and second masses 806, 807 pass over the shell 812, they cast their shadows over the grids 814, 815 for detection by the arrays of sensors 816. Each sensor 816 is so calibrated that the signals generated in response to these shadows encode the current location of the first and second masses 806, 807 with respect to the grids 814, 815. The time sequence of these sensor 816 signals represents the path of the first and second masses 806, 807 over the grids 814, 815 and therefore the character of the earthquake that caused the first and second masses 806, 807 to move.

The first and second output ports 818, 819 receive the sensor 816 signals from the first and second grids 814, 815 and generate for output a composite digital signal representing the current sensor 816 response of the respective grid 814, 815.

With reference to FIGS. 5 and 8, the earthquake sensor 800 may connect to the site control unit 546 as an environmental sensor 562.

Although specific embodiments of the present invention have been described and illustrated, it will be appreciated that various changes can be made therein without departing from the spirit and scope of the invention. The present invention is not limited to the features of these embodiments, but includes all variations and modifications within the scope of the claims.

The embodiments of the invention in which an exclusive property or privilege is claimed are defined as follows:

1. A system for affecting the interaction of a set of member utilities interacting with the environment of a site, each member of the set of utilities being created externally from the site and being conducted into the site through an input port having at least one access state wherein the input port facilitates access to the site and at least one restriction state wherein the input port restricts access to the site and being conducted out of the site through an output port having at least one egress state wherein the output port facilitates egress from the site and at least one restriction state wherein the output port restricts egress from the site, the system comprising:
  (i) means for generating a first fault signal in response to a condition that threatens to degrade the environment of the site, wherein the means for generating the first fault signal includes:
    (a) means for detecting whether each member of the set of utilities, as measured at its input port, is faulty,
    (b) means for detecting whether each member of the set of utilities, as measured at its output port, is faulty, and
    (c) means for detecting whether each member of the set of utilities, as measured within the site, is faulty;
  (ii) means for ensuring that the input port for each member of the set of utilities is in a predetermined safe state in response to the first fault signal, the safe state being either an access state or a restriction state; and
  (iii) means for selectively restoring the input port for certain members of the set of utilities to predetermined operating states in response to a change in the first fault signal, the operating state being either an access state or a restriction state.

2. A system as in claim 1 wherein a member of the set of utilities is designated faulty if said member has one or more of the following characteristics:
  (1) it exists in the wrong quantity; and
  (2) it is of a wrong quality.

3. A system as in claim 2 further comprising means for receiving at predetermined intervals:
  (a) the results of the input port detection means,
  (b) the results of the output port detection means, and
  (c) the results of the within-site detection means, whereby a measurement dataset is formed from the detection results for each member of the set of utilities and the time the results were received.

4. A system as in claim 3, further comprising means for recording each measurement dataset to form a measurement dataset history database.

5. A system as in claim 4, further comprising an expert rules database correlating measurement dataset histories to preferred access states or restriction states for the input port of each member of the set of utilities and preferred egress states or restriction states for the output port of each member of the set of utilities.

6. A system as in claim 5, wherein the means for generating the first fault signal includes means for comparing the measurement dataset history database to the expert rules database to determine the preferred access state or restriction state for the input port of each member of the set of utilities and the preferred egress state or restriction state for the output port of each member of the set of utilities.

7. A system as in claim 6, further comprising means for recording at predetermined intervals the first fault signal whereby a signal dataset history database is formed.

8. A system as in claim 7, wherein the expert rules database further correlates signal dataset histories to preferred access states or restriction states for the input port of each member of the set of utilities and preferred egress states or restriction states for the output port of each member of the set of utilities.

9. A system as in claim 8, wherein the means for generating the first fault signal also compares the signal dataset history database to the expert rules database.

10. A system as in claim 9, further comprising a set of sensors for generating a set of signals in response to a set of conditions that threaten to degrade the environment of the site.

11. A system as in claim 10, further comprising means for recording at predetermined intervals the set of signals from the set of sensors, whereby an environment dataset history database is formed.

12. A system as in claim 11, wherein the expert rules database further correlates environment dataset histories to preferred access states or restriction states for the input port of each member of the set of utilities and preferred egress states or restriction states for the output port of each member of the set of utilities.

13. A system as in claim 12, wherein the means for generating the first fault signal also compares the environment dataset history database to the expert rules database.

14. A system as in claim 13, further comprising means for combating a threat to the environment of the site, the combating means having at least one operating state and at least one standby state, the current state being determined in response to a third signal.

15. A system as in claim 14, wherein the expert rules database correlates measurement dataset histories, signal dataset histories, and environment dataset histories to preferred operating states and standby states for the combating means.

16. A system as in claim 15, further comprising means for generating the third signal by comparing the measurement dataset history database, signal dataset history database, and environment dataset history database to the expert rules database.

17. A system as in claim 16, further comprising means for recording at predetermined intervals the third signal, whereby a combating means dataset history database is formed.

18. A system as in claim 17, wherein the expert rules database further correlates combating means dataset histories to preferred access states or restriction states for the input port of each member of the set of utilities, preferred egress states or restriction states for the output port of each member of the set of utilities and preferred operating states and standby states for the combating means.

19. A system for affecting the interaction of a set of member utilities interacting with the environment of a site, each member of the set of utilities being created externally from the site and being conducted into the site through an input port having at least one access state wherein the input port facilitates access to the site and at least one restriction state wherein the input port restricts access to the site and being conducted out of the site through an output port having at least one egress state wherein the output port facilitates egress from the site and at least one restriction state wherein the output port restricts egress from the site, the system comprising:
  (i) means for generating a first fault signal in response to a condition that threatens to degrade the environment of the site,
  (ii) means for ensuring that the input port for each member of the set of utilities is in a predetermined safe state in response to the first fault signal, the safe state being either an access state or a restriction state; and
  (iii) means for selectively restoring the input port for certain members of the set of utilities to predetermined operating states in response to a change in the first fault signal, the operating state being either an access state or a restriction state, wherein the restoring means sequentially restores the input port for each member of the set of utilities to a predetermined operating state, and wherein the input port for an emergency water utility is the first port operated on by the restoring means.

20. A system as in claim 19, wherein the input port for a main water utility is operated on by the restoring means after the input port for the emergency water utility.

21. A system as in claim 20, wherein the input port for a gas utility is operated on by the restoring means after the input port for the main water utility.

22. A system as in claim 21, wherein the input port for a electrical utility is operated on by the restoring means after the input port for the gas utility.

23. A system as in claim 21, further including:
(a) means for generating a third fault signal in response to a condition under which the input port of a first designated member of the set of utilities should not be restored to its predetermined operating state; and
(b) means responsive to the third fault signal for pre-empting the restoring means from restoring the input port of the first designated member of the set of utilities to its predetermined operating state.

24. A system as in claim 21, further including:
(a) means for generating a fourth fault signal in response to a fault condition in a second designated member of the set of utilities; and
(b) means responsive to the fourth fault signal for forcing the input port of the second designated member of the set of utilities into its predetermined safe state.

* * * * *